3,632,810
DERIVATIVES OF 7-AMINO CEPHALOSPORANIC ACID

Hans Bickel, Binningen, Rolf Bosshardt, Arlesheim, Bruno Fechtig, Reinach, Enrico Menard, Basel, Johannes Mueller, Arlesheim, and Heinrich Peter, Riehen, Switzerland, assignors to Ciba Corporation, Summit, N.J.
No Drawing. Filed Dec. 11, 1968, Ser. No. 783,121
Int. Cl. C07d 99/24
U.S. Cl. 260—243 C     10 Claims

ABSTRACT OF THE DISCLOSURE 7-(imidazolyl-acetylamino)-cephalosporanic acids. Use: antibiotics.

---

The subject of the invention is the manufacture of new therapeutically active derivatives of 7-amino-cephalosporanic acid of Formula I

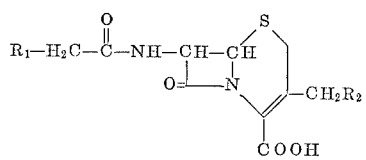

wherein $R_1$ is an imidazolium or imidazolyl group which may be hydrogenated and which is bonded to the acetylamino group by a nitrogen atom and wherein $R_2$ is a free hydroxy group or a hydroxyl group esterified by a carboxylic acid, in which ester oxygen atoms may be replaced by sulphur atoms, an optionally N-substituted carbamoyloxy group in which oxygen atoms may be replaced by sulphur, or a quaternary ammonium group, and their possible inner salts.

The term hydrogenated imidazole is to be understood as an imidazoline or imidazolidine. The imidazole residue may also be substituted, especially by lower alkyl, lower alkoxy or hydroxy groups, and furthermore for example by lower alkylmercapto groups or halogen atoms such as iodine, bromine, fluorine and especially chlorine. The rings may have one or more identical or different substituents.

An esterified hydroxyl group $R_2$ in which the oxygen atoms may be replaced by sulphur is derived from a carboxylic acid and is preferably the acetoxy group or a monocyclic or dicyclic arylcarbonyloxy or arylthiocarbonyloxy, arylcarbonylmercapto or arylthiocarbonylmercapto group which is for example substituted by lower alkyl, lower alkoxy or lower alkylmercapto residue, halogen atoms or the nitro group, especially the benzoylmercapto group. As further examples of $R_2$ there may be quoted:

(a) A carbamoyloxy group of formula

wherein $R_3$ is an aliphatic, aromatic, araliphatic or heterocyclic residue, especially an unsubstituted or substituted, preferably substituted by one or more lower alkoxy groups or halogen atoms, straight-chain or branched lower alkyl residue such as the methyl or ethyl residue but above all the β-chloroethyl residue; or (b) A thiocarbamoylmercapto group of formula

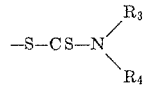

wherein $R_3$ has the significance given above and $R_4$ represents hydrogen or $R_3$; or (c) A quaternary amino group in which the quaternary nitrogen atom is for example part of an aromatic ring such as a quinoline, isoquinoline or pyrimidine ring, but especially of an unsubstituted or substituted pyridine ring, for example of formula

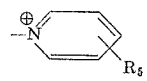

wherein $R_5$ represents hydrogen or one or more lower alkyl, lower alkoxycarbonyl, carbamoyl or carboxyl groups or one or more halogen atoms.

The salts of the new compounds are metal salts, above all salts of therapeutically usable alkali or alkaline earth metals such as sodium, potassium, ammonium or calcium, or salts with organic bases, for example triethylamine, N-ethylpiperidine, dibenzylethylenediamine, or procaine. If the group $R_1$ or $R_2$ is basic, then inner salts can form.

The new compounds have a particularly good antibacterial effect. They are effective both against gram-positive and also above all against gram-negative bacteria, for example against penicillin-resistant *Staphylococcus aureus*, *Escherichia coli*, *Klebsiella pneumoniae*, *Salmonella typhosa* and *Bacterium proteus*, as is also found in animal experiments, for example with mice. They may therefore be used for combatting infections which are caused by such microorganisms, and furthermore as feedstuff additives, for the preservation of foodstuffs or as disinfectants. Compounds in which $R_1$ is an unsubstituted imidazole ring or an imidazole ring substituted by methyl in the 2- or 3-position and $R_2$ is the acetoxy group, the β-chloroethylcarbamoyl group or a pyridino group which is unsubstituted or substituted as specified above are particularly valuable.

The new compounds are obtained if (a) a compound of Formula II

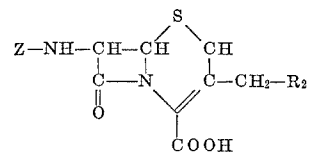

wherein Z represents a halogenacetyl residue like the fluoracetyl, chloracetyl, iodoacetyl or above all the bromacetyl residue and $R_2$ has the significance indicated above, is with an imidazole which may be hydrogenated or (b) A compound of Formula II, wherein Z represents hydrogen, is acylated by the group $R_1$—$CH_2$—CO— in which $R_1$ represents an imidazolyl group which may be hydrogenated and, if desired, resulting compounds having a free hydroxyl group $R_2$ or a hydroxyl group $R_2$ esterified by a carboxylic acid are converted into one another and, if desired, the group $R_2$ in resulting compounds in which $R_2$ represents a hydroxyl group esterified by a carboxylic acid in which oxygen atoms can be replaced by sulphur atoms, is replaced in a manner which is in itself known by an optionally N-substituted carbamoyloxy group in which oxygen atoms may be replaced by sulphur, or by a quanternary amino group, and the resulting compounds are optionally, if desired, converted to their metal salts, such as alkali or alkaline earth metal salts, or salts with ammonia or organic bases or the free carboxylic acids or inner salts are formed from resulting salts.

The reaction of Compound II, wherein Z represents a halogenacetyl group, with an imidazole or hydrogenated imidazole is preferably carried out in an inert solvent for the compound, such as methylene chloride, chloroform, carbon tetrachloride, tetrahydrofurane, dioxane, dimethylformamide or acetonitrile and in the presence of a reagent which bonds hydrogen halides, for example a weak inorganic base such as an alkali metal carbonate, bicarbonate or acetate or a tertiary amine, preferably ethyldiisopropylamine (Hünig base). An excess of the imidazole or hydrogenated imidazole may also serve as the reagent which bonds the hydrogen halide. The reaction takes place at room temperature within a few hours; it may, if desired, also be carried out at a lower or slightly raised temperature.

The acylation of Compound II, wherein Z represents hydrogen, is carried out in the manner which is known for the acylation of aminoacids, for example by means of an acid halide, especially and acid chloride, or by an acidazide or an acid anhydride, especially a mixed anhydride, for example a mixed anhydride formed with monoesterified carbonic acid, pivalic acid or trichloracetic acid, or with the free acid itself in the presence of a condensing agent such as a carbodiimide, for example dicyclohexylcarbodiimide.

An alternative manner of acylating Compound II consists in first silylizing or stannylizing a Compound II in which Z represents hydrogen, and then acylating the product with the acid or a reactive acid derivative containing the $R_1$—$CH_2$—CO— group, and splitting off any silyl or stannyl groups present by means of alcohol or water; cf. for example British Pat. 1,073,530 and Dutch patent application No. 6717107.

Preferably such starting substances as lead to the end products which have been mentioned as being particularly effective are used.

The cephalosporin derivatives used as starting substances are known or may be manufactured by processes which are in themselves known.

The new compounds may be used as medicines, for example in the form of pharmaceutical preparations. These contain the compounds mixed with a pharmaceutical organic or inorganic, solid or liquid excipient which is suitable for enteral, topical or parenteral administration. Possible substances for forming the excipient are those which do not react with the new compounds, such as for example water, gelatine, lactose, starch, stearyl alcohol, magnesium stearate, talc, vegetable oils, benzyl alcohols, gums propylene glycol, polylakylene glycols, white petroleum jelly, cholesterol or other known medicine excipients. The pharmaceutical preparations may for example be in the form of tablets, dragées, ointments, creams, capsules or in a liquid form as solutions, suspensions or emulsions. They are optionally sterilised and/or contain adjuvants such as preservatives, stabilisers, wetting agents or emulsifiers, solubilising agents or salts for regulating the osmotic pressure or buffers. They may also contain other therapeutically valuable substances. The preparations are formulated by the usual methods.

The invention is described in the following examples.

The abbreviation 7–ACA is used below for 7-aminocephalosporanic acid.

The following systems are used in thin layer chromatography on silica gel plates:

Systems 52=n-butanol/glacial acetic acid/water (75:7.5:21)

Systems 101 A=n-butanol/pyridine/glacial acetic acid/water (42:24:4:30).

In the examples, "MIC" means the minimum inhibitory concentration which is measured by the gradient plate test described in "Antibiotics" vol. I by Gottlieb and Shaw, New York 1967, page 508. The MIC is determined on strains of *Staphylococcus aureus* SG 511 (sensitive to penicillin) or *Staphylococcus aureus* 2999 (resistent to penicillin), *Bacillus subtilis*, *Bacillus megatherium*, *Escherichia coli* 2018, *Klebsiella pneumoniae* and/or *Salmonella typhimuri*.

EXAMPLE 1

5.92 g. (15 mmol) of bromoacetyl-7-ACA are dissolved in 45 ml. of dimethylformamide and 2.58 g. (31.5 mmol) of 1-methyl-imidazole in 27 ml. of methylene chloride are added to the solution. After 7 hours 1 ml. of glacial acetic acid is added and the reaction mixture is treated with 12.5 ml. of methylene chloride/tetrahydrofurane (4:1, volume/volume). The mixture is decanted off the resinous precipitate and the decanted material is mixed with 75 ml. of the same solvent mixture. The resinous precipitate so obtained is separated off, triturated with 75 ml. of the same solvent mixture until a granular product is obtained, and the product filtered off, washed with tetrahydrofurane and dried in a high vacuum. 4.95 g. of crude 7-[1-methylimidazolium-(3)-acetylamino]-cephalosporanic acid are thus obtained; a further 1.6 g. may be obtained from the filtrate by adding tetrahydrofurane.

In order to convert the material to the sodium salt 2.5 g. of the crude product are dissolved in 9.25 ml. of methanol and mixed with 3.25 ml. of a 3 M methanolic solution of sodium α-ethylhexanoate and then with 12.5 ml. of tetrahydrofurane. On standing in the cold the sodium salt crystallises out. This material is easily soluble in water. It contains a bromine ion which is probably at the quaternary nitrogen of the imidazole ring. After recrystallisation it decomposes at 178° C. in evacuated capillary tube, without melting. $[\alpha]_D^{20}=+113°$ C.$\pm 1°$ C. (c.=1, in water). $Rf_{52}=0.01$, $Rf_{101A}=0.35$. The U.V. spectrum in water shows maxima at $\lambda=260$ m$\mu$ ($\epsilon=8,500$) and at $\lambda=340$ m$\mu$ ($\epsilon=350$). MIC: *St. aureus* SG 511=0.6 $\gamma$/ml.; *Bac. subtilis*=0.2 $\gamma$/ml.; *Bac. megath.*=45 $\gamma$/ml.

EXAMPLE 2

5.92 g. (15 mmol) of bromoacetyl-7-ACA are dissolved in 45 ml. of dimethylformamide. A solution 3.37 g. (49.5 mmol) of imidazole in 22.5 ml. of methylene chloride is added thereto, and flushed down with 7.5 ml. of methylene chloride. Since the reaction mixture becomes warm, the flask is placed in ice water for a short time. After 6 hours 1.17 ml. of glacial acetic acid are added and the 7 - [imidazolyl-(1) - acetylamino]-cephalosporanic acid is isolated by fractional precipitation.

For this purpose the reaction mixture is mixed with 37.5 ml. of a mixture of 4 parts by volume of methylene chloride and 1 part by volume of tetrahydrofurane, which results in a precipitate which is removed by suction filtration.

30 ml. of methylene chloride and 160 ml. of tetrahydrofurane are added to the filtrate, with stirring. The colourless precipitate which thereupon results is filtered off and washed with tetrahydrofurane. Since the material still contains a little dimethylformamide it is triturated with 75 ml. of methylene chloride/tetrahydrofurane mixture (4:1), filtered and again washed with tetrahydrofurane. After drying in a high vacuum the 7-[imidazolyl-(1)-acetylamino]-cephalosporanic acid is obtained as practically colourless powder.

The substance turns yellowish at 131° C. and melts between 141° C. and 150° C., with decomposition, in an evacuated capillary tube. $[\alpha]_D^{20}=+127°$ C.$\pm 1°$ C. (in water, c.=1). $Rf_{52}=0.03$; $Rf_{101A}=0.50$. MIC: *St. aureus* SG 511=0.5 $\gamma$/ml.; *Bac. subtilis*=0.1 $\gamma$/ml.; *Bac. megath.*=55 $\gamma$/ml.; *E. coli* 2018=20 $\gamma$/ml. *Kl. pneumonial*=15 $\gamma$/ml.; *Salm. typh.*=15 $\gamma$/ml.

EXAMPLE 3

393 mg. (1.0 mmol) of bromoacetyl-7-ACA are dissolved in 2.5 ml. of dimethylformamide. A solution of 254 mg. (3.1 mmol) of 2-methylimidazole in a mixture of 1.5 ml. of methylene chloride and 0.5 ml. of dimethylformamide is added thereto, and flushed down with 0.5 ml. of methylene chloride. After 200 minutes 0.066 ml. of glacial acetic acid is added and the 2-methyl-imidazolyl acetyl-7-ACA is isolated by fractional precipitation.

For this purpose the reaction solution is mixed with 4.5 ml. of a mixture of 4 parts by volume of methylene chloride and 1 part by volume of tetrahydrofurane and the resulting flocculent precipitate is separated off by filtration. 20 ml. of tetrahydrofurane are added to the filtrate with stirring, and the resulting precipitate is suction-filtered.

Since the precipitate still contains dimethylformamide it is thoroughly triturated with 5 ml. of a methylene chloride/tetrahydrofurane mixture (4:1), again filtered and washed with tetrahydrofurane. After drying in a high vacuum the 7 - [2 - methyl-imidazolyl-(1)-acetylamino]-cephalosporanic acid is obtained as a colourless powder. The substance turns brown at 145° C. and melts with decomposition at between 160° C. and 170° C. in an evacuated capillary tube. $[\alpha]_D^{20}=+136°$ C.$\pm 1°$ C. (in water; c.=1). $Rf_{52}=0.03$; $Rf_{101A}=0.48$.

EXAMPLE 4

11.75 g. of 3-(desacetoxymethyl)-3-benzoylthiomethyl-7-bromoacetylamino-cephalosporanic acid are dissolved in 45 ml. of dimethylformamide with the addition of a solution of 5.25 g. of imidazole in 12 ml. of dimethylformamide. The solution is treated with 1.45 ml. of glacial acetic acid and allowed to stand at room temperature with exclusive of light. After 23 hours, 56 ml. of ½₂ N-hydrochloric acid are slowly added with good stirring and cooling in ice-water. The brown, greasy precipitate which forms is filtered through a thin layer of Hyflo. While vigorously stirred and cooled with ice, the filtrate is treated rapidly with another 570 ml. of ½₂ N-hydrochloric acid, after which the batch is stirred for another hour with cooling. The flaky precipitate of 3-(desacetoxy-methyl)-3-benzoylthiomethyl - 7 - [imidazolyl - (1) - acetylamino]-cephalosporanic acid which forms is filtered off with suction and washed with 10 ml. of water. $Rf_{52}=0.13$; $Rf_{101A}=0.35$. U.V. spectrum in 0.1-molar sodium bicarbonate solution:

$\lambda_{max}=243$ nm. ($\epsilon=14,200$)
$\lambda_{max}=273$ nm. ($\epsilon=15,600$).

The starting material can be prepared as follows:

A solution of 17.5 g. of 3-(desacetoxymethyl)-3-benzoylthiomethyl - 7 - amino - cephalosporanic acid (cf. Belgian Pat. 650,444) and 12.5 ml. of triethylamine in 1 liter of dimethylformamide is added dropwise in the course of 1 hour to a well-stirred solution of 9.2 ml. of bromoacetyl bromide in 100 ml. of methylenechloride (in an atmosphere of nitrogen) which is kept at −13 to −15° C.

The temperature is allowed to rise slowly to 10° C. in the course of an hour and a half, and kept at that level for half an hour. The greater part of the solvents is then distilled off under a pressure of 0.5–1 mm. of Hg with the use of a condenser filled with Dry Ice and acetone.

The oily product is poured on a phosphate buffer of pH 6 and agitated with 1 liter of ethyl acetate. At the border line between the two phases a precipitate forms which is separated by filtration or centrifuging. The pH of the aqueous phase is adjusted to 2, which operation is followed by saturation with sodium chloride and separation of the organic phase. The aqueous phase is further extracted with 600 and then 400 ml. of ethyl acetate. The organic phases are washed with saturated sodium chloride solution, dried over sodium sulfate, and filtered successively through a column of 100 mg. of silica gel. The filtrates are concentrated to dryness under reduced pressure, the residue treated with 30 ml. of ethanol, and crystallized at −20° C. 7.8 g. of 3-(desacetoxymethyl)-3-benzoylthiomethyl - 7 - bromoacetylaminocephalosporanic acid melting at 137–138° C. are obtained. $Rf_{52}=0.55$. The sodium salt exhibits in the U.V. spectrum in water: $\lambda_{max}$ 243 nm. ($\epsilon=16,800$) and 275 nm. ($\epsilon=20,600$), $[\alpha]_D^{20}=-47\pm1°$ (c.=1; in 0.1 molar sodium bicarbonate + acetone (1:1). MIC: *St. aureus* SG 511=0.25 γ/ml.; *St. aureus* 2999=15 γ/ml.; *Bac. subtilis*=0.045 γ/ml.

EXAMPLE 5

5.13 g. of 3-(desacetomethyl)-3-benzoylthiomethyl-7-[imidazolyl-(1)-acetylamino] - cephalosporanic acid are dissolved in 45 ml. of pyridine and the solution is diluted with 45 ml. of dioxan. 26 ml. of a 40% mercury perchlorate solution are added, and the batch allowed to react while being vigorously stirred for 45 minutes at 45° C. (under an atmosphere of nitrogen). The batch is cooled, treated with 13.8 ml. of thiobenzoic acid, and agitated for 5 minutes. The solvents are distilled off under reduced pressure, and a solution of the residue in 250 ml. of water filtered through "Celite." The filtrate is washed successively with 110 ml. of toluene, 2× 68 ml. of "Amberlite" LA-2 in 140 ml. of toluene, and 2× 110 ml. of toluene. The aqueous phase is filtered through a column consisting upwards of 10 ml. of "Sephadex" CM C–25 (H⁺ form), 42 ml. of "Alox," 10.5 ml. of "Zeo-Karb" 226 (H⁺ form), 42 ml. of "Alox," 10.5 ml. of "Dowex-1" (acetate form), and 10 ml. of "Sephadex" CM C–25 (H⁺ form). "Celite,e" the organic phases and the column are further extracted with 2× 30 ml. of water, and the column is in addition eluted with another 300 ml. of water. The eluates are combined and concentrated under reduced pressure, a small amount of a precipitate is removed by filtration, and the filtrate evaporated to dryness. The residue is triturated with 10 ml. of alcohol and yields pure 3-(desacetoxymethyl)-3-pyridinomethyl-7-[imidazolyl(1) - acetylamino] - cephalosporanic acid. $[\alpha]_D^{20}=+76°\pm1°$ (c.=1 in H$_2$O); U.V. spectrum in water: $\lambda_{max}$ 257 nm. ($\epsilon=11,650$); $Rf_{101A}=0.05$. MIC: *St. aureus* SG 511=0.01 γ/ml.; *Bac. subt.*=0.2 γ/ml.; *Bac. megath.*=50 γ/ml.; *E. coli* 2018=20 γ/ml.; *Kl. pneum.*=35 γ/ml.; *Salm. typh.*=25 γ/ml.

EXAMPLE 6

1.97 g. 7-[imidazolyl(1)-acetylamino]-cephalosporanic acid are dissolved in 100 ml. of water, the solution heated to 37° C. and given a pH of 7.5 with 57.5 ml. of 0.1 N-sodium hydroxide solution. After that, a suspension of 50 mg. of ectylesterase (from *Bacillus subtilis* ATCC 6633, cf. British Pat. 1,080,904) in 2 ml. of water is added, and the acetic acid which forms is neutralized currently by means of an automatic titrator with 0.1 N-sodium hydroxide solution (adjustment to pH 7.3). The reaction is complete after 4 hours. The pH is adjusted to 6.5, the solution filtered through a glass frit G4 and lyophilized. 2.62 g. of a yellowish resin of the sodium salt of 7 - [imidazolyl-(1) - acetylamino] - O - desacetyl-cephalosporanic acid are obtained.

This crude product is dissolved as it is in a mixture of 22 ml. of absolute dimethyl formamide and 6.15 ml. of triethylamine, then treated with 3.7 ml. of β-chlorethyl-isocyanate and stirred for half an hour at room temperature. The solvent is then expelled in a high vacuum, and the resinous, brown residue triturated several times with 100 ml. of absolute ether each time. The ether-insoluble residue is dissolved in 60 ml. of water and extracted with 200× 300 ml., then with 2× 150 ml. of ethyl acetate. The organic phases are washed twice with 15 ml. of water each time. The aqueous phase is filtered through a Sephadex column and the latter washed with water. To this end, a column of Sephadex Cm 25 C (H⁺ form) of 2.1 cm. diameter and 9 cm. height is used. The first 80 ml. of eluate contain a by-product. The next 150 ml. of eluate consist of a yellowish solution of the active substance. The solution is filtered through a thin layer of "Celite" and lyophilized to obtain the highly purified O-desacetyl-O-(β-chlorethylcarbamoyl) - 7 - [imidazolyl-(1)-acetylamino]-cephalosporanic acid in the form of a voluminous powder.

In the ultraviolet spectrum it has a $\lambda_{max}$ at 254 nm., with $\epsilon=8050$ (in water). The optical rotation is $[\alpha]_D^{20}=+154°\pm1°$ (c.=0.83 in water). In the thin-layer chromatogram it shows the following Rf values: in the system 101A=0.3; in the system ethyl acetate:pyridine:glacial acetic acid:water (62:21:6:11)=0.07.

What is claimed is:

1. A compound of the Formula I

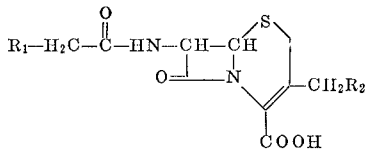

wherein $R_1$ is an imidazolium or imidazolyl group which may be hydrogenated and which is bonded to the acetylamino group by a nitrogen atom and which is unsubstituted or substituted by a member selected from the group consisting of lower alkyl, lower alkoxy, lower alkyl-mercapto, hydroxy and halogen, and wherein $R_2$ is a monocyclic arylcarbonylmercapto group and which unsubstituted or substituted by a member selected from the group consisting of lower alkyl, lower alkoxy, lower alkyl-mercapto, halogen and nitro or an N-substituted carbamoyloxy group in which the substituents on the nitrogen atoms are members selected from the group consisting of lower alkyl, alkoxy-substituted lower alkyl and halo-substituted lower alkyl or a therapeuticaly useful salt thereof.

2. A compound of the Formula I as claimed in claim 1, in which $R_1$ represents an optionally quaternary imidazole or hydrogenated imidazole radical which is bonded to the acetylamino group by a nitrogen atom and which is substituted by lower alkyl or lower alkoxy groups, and $R_2$ has the meaning given in claim 1, or a therapeutically useful salt thereof.

3. A compound of the Formula I as claimed in claim 1, in which $R_1$ represents an optionally quaternary imidazole or hydrogenated imidazole radical which is bonded to the acetylamino group by a nitrogen atom and which is unsubstituted or substituted by one or more substituents selected from the group consisting of lower alkyl, lower alkoxy, lower alkylmercapto, the hydroxy group and/or halogen atoms, and $R_2$ stands for the benzoylmercapto group, or a therapeutically useful salt thereof.

4. A compound of the Formula I as claimed in claim 1, wherein $R_1$ represents an optionally quaternary imidazole or hydrogenated midazole radical which is bonded to the acetylamino group by a nitrogen atom and which is unsubstituted or substituted by one or more substituents selected from the group consisting of lower alkyl, lower alkoxy, lower alkylmercapto, the hydroxy group and/or halogen atoms, and $R_2$ stands for a lower alkyl-carbamoyloxy group, or a therapeutically useful salt thereof.

5. A compound of the Formula I as claimed in claim 1, wherein $R_1$ represents an optionally quaternary imidazole or hydrogenated imidazole radical which is bonded to the acetylamino group by a nitrogen atom and which is unsubstituted or substituted by one or more substituents selected from the group consisting of lower alkyl, lower alkoxy, lower alkyl-mercapto, the hydroxy group and/or halogen atoms, and $R_2$ stands for a carbamoyloxy group of the formula $$-O-CO-NH-R_3$$

in which $R_3$ represents a lower alkyl radical substitued by one or more lower alkoxy groups or halogen atoms, or a therapeutically useful salt thereof.

6. A compound of the Formula I as claimed in claim 1, wherein $R_1$ represents an optionally quaternary imidazole or hydrogenated imidazole radical which is bonded to the acetylamino group by a nitrogen atom and which is unsubstituted or substituted by one or more substituents selected from the group consisting of lower alkyl or lower alkoxy group, halogen atoms or the hydroxyl group, and $R_2$ stands for β-chlorethylcarbamoyloxy group, or a therapeutically useful salt thereof.

7. A compound of the Formula I as claimed in claim 1, wherein $R_1$ represents the imidazole, imidazoline or imidazolidine-(1)-radical, and $R_2$ stands for the β-chlorethyl-carbamoyloxy group.

8. A compound of the Formula I as claimed in claim 1, in which $R_1$ represents the 1-methyl-imidazolium(3)-radical and $R_2$ stands for the β-chlorethyl-carbamoyloxy group.

9. A compound of the Formula I as claimed in claim 1, in which $R_1$ represents the imidazolyl(1)-radical and $R_2$ stands for the β-chlorethyl-carbamoyloxy group.

10. A compound of the Formula I as claimed in claim 1, in which $R_1$ represents the 2-methyl-imidazolyl(1)-radical and $R_2$ stands for the β-chlorethyl-carbamoyloxy group.

References Cited

UNITED STATES PATENTS

| | | | |
|---|---|---|---|
| 3,218,318 | 11/1965 | Flynn | 260—243 C |
| 3,228,934 | 1/1966 | Abraham et al. | 260—243 C |
| 3,296,258 | 1/1967 | Vischer et al. | 260—243 C |
| 3,468,874 | 9/1969 | Raap et al. | 260—243 C |

NICHOLAS S. RIZZO, Primary Examiner

U.S. Cl. X.R.

424—246